(12) United States Patent
Springmann et al.

(10) Patent No.: US 7,841,627 B2
(45) Date of Patent: Nov. 30, 2010

(54) ROTATABLE LEAD-THROUGH

(75) Inventors: Georg Springmann, Müheim/Ruhr (DE); Dieter Warmbier, Moers (DE); Dirk Hasselbrink, Duisburg (DE)

(73) Assignee: Georg Springmann Industrie- und Bergbautechnik GmbH, Mülheim an der Ruhr (DE)

( * ) Notice: Subject to any disclaimer, the term of this patent is extended or adjusted under 35 U.S.C. 154(b) by 811 days.

(21) Appl. No.: 11/784,418

(22) Filed: Apr. 6, 2007

(65) Prior Publication Data
US 2007/0228726 A1 Oct. 4, 2007

Related U.S. Application Data

(63) Continuation-in-part of application No. 10/257,148, filed as application No. PCT/DE01/01291 on Apr. 4, 2001, now abandoned.

(30) Foreign Application Priority Data
Apr. 7, 2000 (DE) .............................. 100 17 184

(51) Int. Cl.
*F16L 27/00* (2006.01)
*F16L 39/04* (2006.01)
(52) U.S. Cl. .................. 285/121.2; 285/121.4; 285/226
(58) Field of Classification Search .................. 285/49,
285/114, 226, 299, FOR. 115, FOR. 117,
285/98, 121.2, 121.3, 121.4, 121.5, 278,
285/279
See application file for complete search history.

(56) References Cited
U.S. PATENT DOCUMENTS

| 1,688,172 | A | 10/1928 | Aldrich et al. |
| 1,859,975 | A | 5/1932 | Malkin |
| 2,196,676 | A | 4/1940 | Johnson et al. |
| 2,366,809 | A | 1/1945 | Seemann |
| 2,381,432 | A | 8/1945 | Bratton |
| 2,673,748 | A | 3/1954 | Shaw |
| 2,794,659 | A | 6/1957 | Bily |
| 2,805,087 | A | * | 9/1957 | Shaw et al. .............. 285/121.4 |
| 2,805,097 | A | 9/1957 | Shaw et al. |
| 3,195,931 | A | 7/1965 | Braunagel |

(Continued)

FOREIGN PATENT DOCUMENTS

DE 196 05 797 8/1997

(Continued)

*Primary Examiner*—James M Hewitt
(74) *Attorney, Agent, or Firm*—Collard & Roe, P.C.

(57) ABSTRACT

A device for connection of a coolant feed to a roller, especially for continuous casting plants, is arranged in that the roller is mounted by journals in bearing blocks in rolling bearings and is supplied with coolant by way of axial bores through the journals. The device includes a flange with an elastic sleeve that is fixable thereon. A first sealing element has a first sealing surface that is fixable on the elastic sleeve and is rotatable therewith. A second sealing element has a second sealing surface engagable with the first sealing surface and is fixed to, supported by or integrated into a bearing block cover fixed on the bearing block for covering the roller bore and the roller bearings. An axial bore penetrates the elastic sleeve and the bearing block cover and permits feeding of coolant into the interior of the roller. The sealing surfaces of the sealing elements are perpendicular to the rotation axis.

16 Claims, 2 Drawing Sheets

U.S. PATENT DOCUMENTS

| | | | |
|---|---|---|---|
| 3,484,853 A | 12/1969 | Nishi | |
| 3,501,174 A | 3/1970 | Walker | |
| 3,514,127 A | 5/1970 | Brooker | |
| 3,692,337 A | 9/1972 | Mischel | |
| 3,801,142 A | 4/1974 | Jones et al. | |
| 4,477,107 A * | 10/1984 | Ferguson et al. | 285/121.4 |
| 4,817,995 A * | 4/1989 | Deubler et al. | 285/98 |
| 4,962,577 A * | 10/1990 | Kubik et al. | 492/7 |
| 5,011,166 A | 4/1991 | Watts | |
| 5,048,847 A | 9/1991 | Kovacs et al. | |
| 5,110,162 A | 5/1992 | Peter et al. | |
| 5,159,811 A | 11/1992 | Hefler et al. | |
| 5,538,292 A | 7/1996 | Sommer | |
| 5,617,879 A | 4/1997 | Kubala | |
| 5,669,636 A | 9/1997 | Kubala | |
| 5,944,363 A | 8/1999 | Cwik et al. | |
| 5,992,901 A | 11/1999 | Gohres et al. | |
| 6,032,463 A | 3/2000 | Bock | |
| 6,631,928 B1 | 10/2003 | Sakata | |
| 7,611,169 B2 * | 11/2009 | Springmann et al. | 285/122.1 |
| 2003/0116964 A1 * | 6/2003 | Springmann et al. | 285/226 |
| 2004/0012199 A1 | 1/2004 | Beach et al. | |

FOREIGN PATENT DOCUMENTS

| | | |
|---|---|---|
| EP | 0392838 | 10/1990 |
| FR | 1 185 248 | 7/1959 |

\* cited by examiner

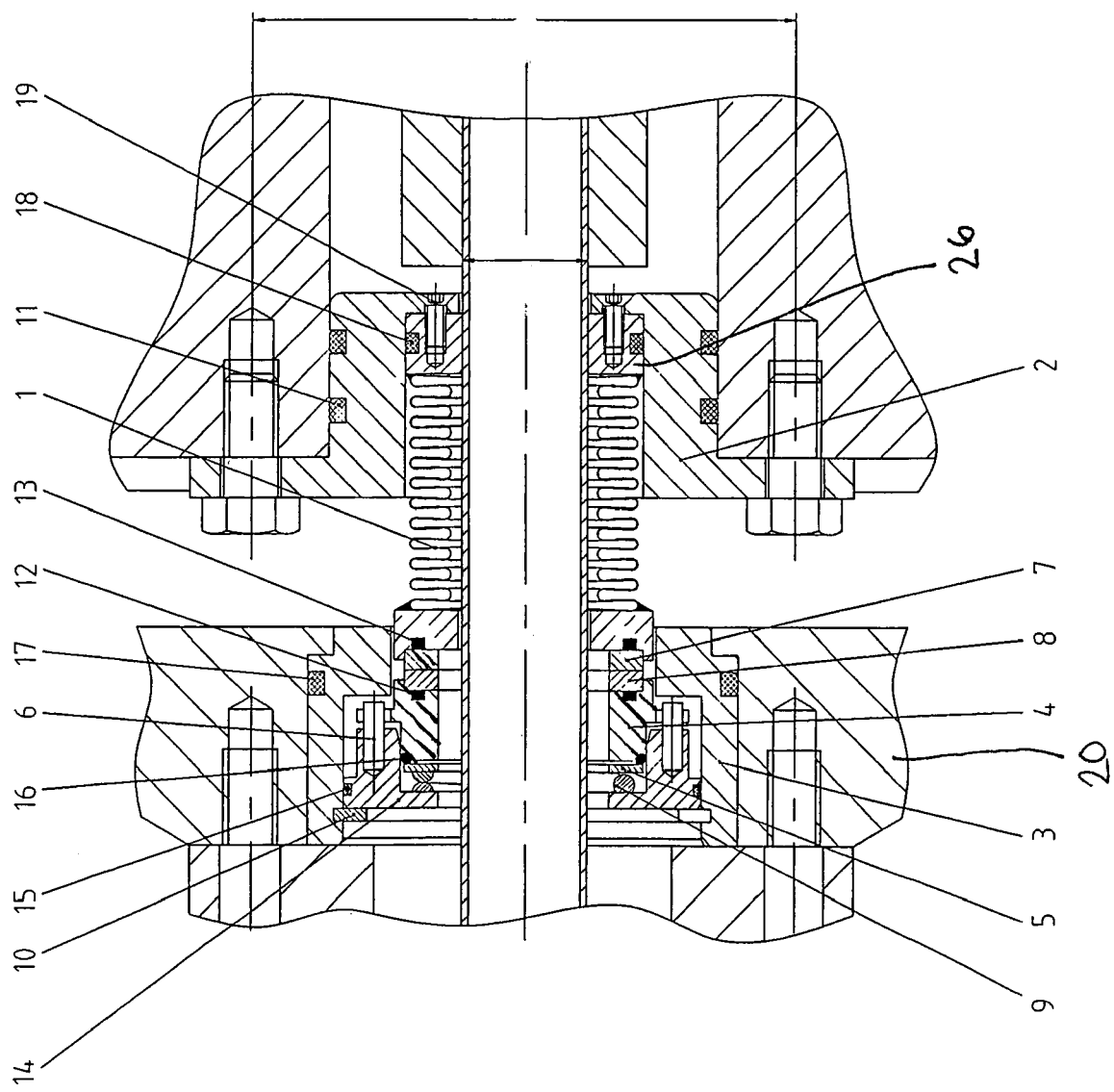

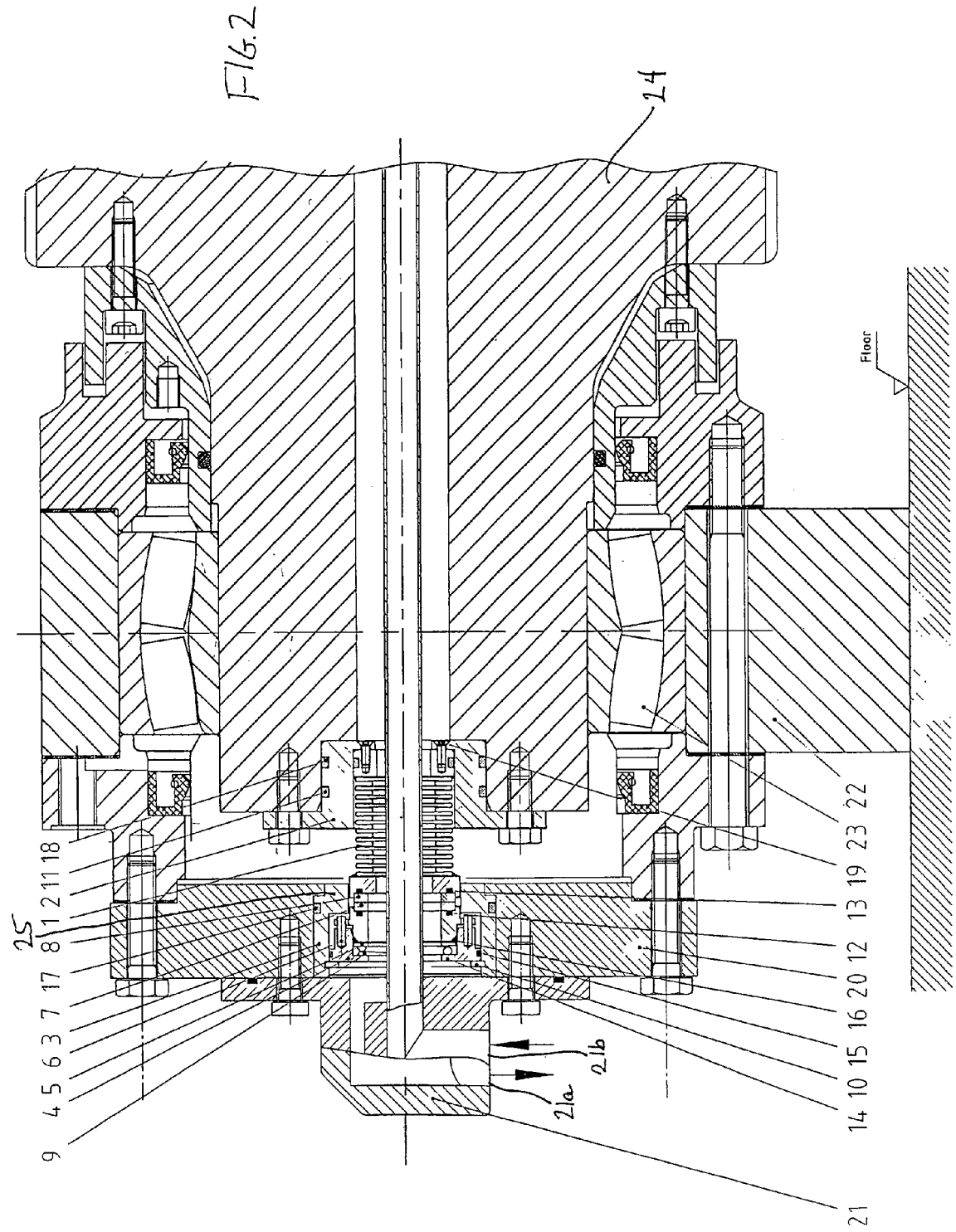

ROTATABLE LEAD-THROUGH

CROSS REFERENCE TO RELATED APPLICATIONS

This application is a Continuation-In-Part under 35 U.S.C. 120 of U.S. patent application Ser. No. 10/257,148, filed on Dec. 2, 2002, now abandoned, which claims priority under 35 U.S.C. 365 from International Patent Application No. PCT/DE01/01291, filed on Apr. 4, 2001, which application claims priority under 35 U.S.C. 119 from German Patent Application No. 100 17 184.2, filed on Apr. 7, 2000.

BACKGROUND AND RELATED ART

The present invention relates to a sealing system for use in cooling a roller, and in particular, to a device for connection of a coolant feed to a roller for continuous casting plants.

Rotatable lead-throughs are required in different branches of industry, especially for continuous casting plants in the steel industry. In these continuous casting plants, the red-hot steel runs in the form of billets over rollers, which are rotatably mounted externally in bearings in bearing blocks. These rollers are cooled in a closed circulation by admission of water under pressure into the interior of the rollers to dissipate heat. The rotatable lead-through seals the transition from the so-called rotor and the cooling water line flange-mounted thereon to the housing secured to the roller and co-rotating with it.

Essentially, two different types of rotatable lead-through are known in the art. A first construction of the rotatable lead-throughs comprises a structural unit lying outside the roller interior, which contains the elements for the necessary water supply, mounting and sealing. Depending on the construction, installations of that kind having such rotatable lead-throughs have a considerable width to the right and left of the bearing blocks.

To reduce the installation width, some system manufacturers have moved the bearing and sealing system to the inside of the roller.

To receive the rotatable lead-through in the roller, a bore is provided, into which the rotatable lead-through is inserted and then fixedly connected, for example, by way of a screwed connection, to the roller. The water used for cooling is introduced into the rotatable lead-through at a pressure of up to about 15 atmospheres above atmospheric pressure, and the water pressure acting on the components, together with the movement of the same and the thermal stress, places heavy demands on the sealing technology.

A technique used to seal the components of the rotatable lead-through moving relative to one another as the roller rotates is based on the use of a radial seal consisting of circular O-rings or lip seals of elastomer as the crucial sealing element.

Other techniques are described in EP-A1-392 838. This publication describes a rotatable lead-through with a sealing arrangement that is operated by the hydraulic pressure of the fluid. This is, however, a structurally complex arrangement.

An attribute common to the rotatable lead-throughs known in the art is that, especially when the roller is subjected to radial loadings, because of the relatively rigid water supply and discharge lines, shearing forces act on the rotatable lead-throughs and cause considerable wear to the rotatable lead-through. An added factor is the mostly complicated mechanical construction of the rotatable lead-throughs known in the art.

It is therefore desired to provide a wear-resistant lead-through, which permits a reliable operation combined with an extended service life, that is of simple construction and, in the case of continuous casting installations currently in use, can be used as an exchangeable component without modification to the installation itself.

SUMMARY OF THE DISCLOSURE

The problems discussed above are solved by providing one embodiment having a rotatable lead-through for connection of a coolant feed to a roller, especially for continuous casting plants, wherein this roller is mounted by way of journals which are part of the roller, in bearing blocks in rolling bearings and which is supplied with the coolant by way of axial bores through the journals. These rotatable lead-throughs have a flange with an elastic sleeve fixed thereon, a first sealing element fixed on the elastic sleeve and rotating therewith and having a first sealing surface. There is a second sealing element having a second sealing surface running on the first sealing surface and being fixed to, supported by or integrated into a bearing block cover fixed on the bearing block for covering the roller bore and the roller bearings, and an axial bore penetrating the elastic sleeve and the bearing block cover and permitting the feeding of coolant into the interior of the roller, wherein the sealing surfaces of the sealing elements are perpendicular to the rotation axis.

In more detail, one embodiment of the present invention refers to a device for connecting of a coolant feed to a roller of continuous casting plants, comprising:

a bearing block, wherein a roller is mounted by way of a journal in the bearing block in a rolling bearing;

a bearing block cover being fixed on the bearing block, which bearing block cover covers the roller bearing and the journal;

a first component group comprising a flange unit having a flange coupled to the roller, an elastic sleeve being coupled to the flange, and a first sealing element being coupled to the elastic sleeve and being rotatable therewith, the first sealing element having a first sealing surface;

a second component group comprising the bearing block cover and a second sealing element having a second sealing surface running on the first sealing surface and being supported by the bearing block cover;

an axial bore penetrating the elastic sleeve and the bearing block cover and permitting the feeding of coolant into the roller through the journal.

The sealing surfaces of the sealing elements are perpendicular to a rotational axis of the roller; and wherein the second sealing element is formed as a sliding ring on the bearing block cover.

The rotatable lead-through according to one of the embodiments of the present invention has one or more of the advantages that it is of simple construction, has an increased resistance to wear and a reduced susceptibility to failure, thus enabling an extended service life to be achieved. Additionally, the components used can easily be exchanged when worn.

The device according to one embodiment of the present invention comprises, as one component group, the flange unit comprising a flange with the elastic sleeve fixed thereon, a first sealing element fixed on the elastic sleeve and rotating therewith and having a first sealing surface. A second component group comprises the bearing block cover with the second sealing element having the second sealing surface running on the first sealing surface.

The bearing block cover is fixed, preferably screwed on the bearing block of the roller, and therefore covers/closes the roller bearings and the roller bore, thereby protecting the rotatable lead-through fitted therein against dirt accumulation and wear.

According to one embodiment, a pressure plate is fixed into the bearing block cover, which supports the second sealing element. Further, the pressure plate may be arranged, optionally resiliently supported, to be movable in the radial direction, so that an improved bearing for the pressure plate is achieved.

Due to the embodiment of the sealing surfaces of the sealing elements running on each other perpendicular to the rotation axis, an enhanced axial mobility of the sealing elements of the rotatable lead-through is achieved, leading to a reduced wear when loaded.

Although the sealing elements may be formed by providing plane surfaces, running on each other, on the sleeve head and the bearing block cover, another embodiment may utilize at least one sliding ring being integrated in one of the planar surfaces of the sealing element. The sealing ring may comprise silicon carbide, carbon graphite or similar materials. In the use of two sliding rings, one of these sliding rings may be fixedly anchored in the stationary component, where the complementary planar surface of the other sliding ring acts as a rotary counter-ring, being able to run on the planar surface of the first sliding ring.

BRIEF DESCRIPTION OF THE DRAWINGS

FIG. 1 is a cross-sectional view, in a section, of a rotatable lead through according to one embodiment of the present invention;

FIG. 2 is a cross-sectional view of a rotatable lead through according to another embodiment of the present invention.

DETAILED DESCRIPTION OF THE EXEMPLARY EMBODIMENTS

An example of one embodiment of the present invention is illustrated in the FIG. 1. FIG. 1 shows, in a section, the inventive device including a one-way rotary lead in part through whereas FIG. 2 shows the inventive device comprising a two-way rotary lead through.

As shown in FIG. 2 and sectionally in FIG. 1, one embodiment of the device comprises a flange 2 with the elastic sleeve 1 fixed thereon. For example, the elastic sleeve 1 may be fixed in a pressure-resistant manner to the flange 2. A sliding ring or sealing element 7 is positioned on one end of the sleeve 1, and corresponding thereto is another sliding ring or sealing element 8 that is further positioned adjacent the pressure plate 4. The pressure plate 4 is positioned adjacent to the housing 3 in the bearing block cover 20 of the rotatable lead-through. The pressure plate 4 may be locked against rotation by means of dowel pins 6 and may be sealed against the pressure plate housing 14 by means of an O-ring 16. A loosening or repositioning of the pressure plate 4 may be avoided by pressing the pressure plate into the cover 20 for covering the roller bore.

The sliding rings 7, 8 may be formed from various low friction materials, however, the use of silicon carbide or electro carbon graphite may be desirable because of their wear resistance. O-rings 12, 13 may be respectively positioned between sliding ring 8 and pressure plate 4, and sliding ring 7 and sleeve head 25, to seal the interface. Similarly, O-rings 11, 17 may be positioned respectively between housing 3 and cover 20, and flange 2 and the roller, which is rotatably mounted in the bearing blocks, to provide a seal. And, O-ring 15 may be positioned between housing 3 and pressure plate housing 14 to provide a seal. The O-rings 11-13 and 15-18 can be formed of materials such as rubber, silicon rubber, etc.

A pressure spring 9 may be positioned between the pressure plate housing 14 and the pressure plate 4 for pressing the pressure plate and its sealing ring against the opposite sealing ring, if needed in addition to the prestressed or compressed elastic sleeve 1 or compensator. A compensator is a corrugated metal or plastic part, mainly a corrugated metal hose or tube which serves as a flexible resilient part which presses the sealing elements onto each other. Additionally, a spacer ring 5 may be positioned between the pressure spring 9 and the pressure plate 4 to compensate for varying tolerances of the parts. Securing ring 10 may be positioned within a wall of housing 3 to limit the axial position of pressure plate housing 14 within housing 3.

In the embodiment shown in the FIG. 2, and in a section, in FIG. 1, the elastic sleeve 1, which may function as a compensator, is held between the cover 20 or sleeve head 25 and the sleeve foot 26 or flange 2, respectively. The elastic sleeve 1 is prestressed or held under a compression force to press the sealing rings against each other. Hereby, a better sealing effect between the sealing surfaces is achieved. The bearing block cover 20 is fixed on the bearing block 22 and covers the bore, the rolling bearings 23 and the roller 24.

In an embodiment not illustrated in the figure, the elastic sleeve is formed in shape of a hollow rubber cylinder fitted between sleeve foot and sleeve head, and may be reinforced by means of a fabric. In this embodiment, a particular flexibility or elasticity of the sleeve is achieved and therefore, the wear of the rotatable lead-through on load is further reduced.

In one embodiment, the elastic sleeve 1 may be removable from the flange. In this embodiment, one elastic sleeve may be exchanged for another elastic sleeve 1 in order to adjust the amount of sleeve prestress or compression to adapt to the sealing conditions. Additionally, the replacement sleeves may be utilized for adapting the length of the sleeve to the corresponding distance between bearing block and bearing block cover. In this way, the length of the sleeve may easily be changed. In this case, the end of the sleeve 1 facing to the interior of the roller is removably fixed via the sleeve foot on the flange 2 by means of screws 19, and the sleeve foot is pressure sealed against the flange 2 by means of the O-ring 18.

The water-intake or -feed into the interior of the roller is realized by the siphon pipe with connection fitting 21 penetrating the rotatable lead-through, which is inserted from exterior through the cover 20 for covering the roller bore and fixed thereto on its outer side. In the embodiment of FIG. 1, there is a one way water supply where water is introduced via the center bore into the roller and the water is lead through the roller to the other end of the roller where there is a second lead-through. In other words, the two lead-throughs respectively define an inlet 21b and an outlet 21a on opposite sides of the roller. In the embodiment of FIG. 2, a two way lead-through may be utilized where, on one side of the roller, water is introduced via a central tube having a sufficient length to extend to the center of the roller, and then the water is lead through a ring-shaped or annular channel back to the lead-through to leave the roller. In other words, the one lead-through defines and inlet and outlet on the same side of the roller. The embodiment is shown in the drawing.

The device according to the present invention may be easily disassembled into its components, so that a fast exchange of worn components is possible.

The present invention has been described with reference to exemplary embodiments. However, it will be readily apparent to those skilled in the art that it is possible to embody the invention in specific forms other than as described above without departing from the spirit of the invention. The exemplary embodiments are illustrative and should not be considered restrictive in any way. The scope of the invention is given by the appended claims, rather than the preceding description, and all variation and equivalents which fall within the range of the claims are intended to be embraced therein.

The following reference numerals are utilized in FIGS. 1 and 2:

No. Part
1 metal sleeve
2 flange
3 housing
4 pressure plate
5 spacer ring
6 dowel pin
7 sliding ring
8 sliding ring
9 pressure spring
10 secure ring
11 o-ring
12 o-ring
13 o-ring
14 pressure plate housing
15 o-ring
16 o-ring
17 o-ring
18 o-ring
19 fastening screw
20 bearing block cover for covering the roller bearing
21 connection fitting with siphon pipe
22 bearing block
23 rolling bearing
24 roller
25 sleeve head
26 sleeve foot

What is claimed is:

1. A device for connecting of a coolant feed to a roller of continuous casting plants, comprising:
   a bearing block, comprising journals and a roller bearing, wherein said bearing block is configured to mount on the roller by way of said journals in said bearing block in said roller bearing;
   a bearing block cover, being fixed on said bearing block, wherein said bearing block cover covers said roller bearing and said journals;
   a first component group comprising a flange unit having a flange configured to be coupled to the roller, an elastic sleeve being coupled to said flange, and a first sealing element being coupled to said elastic sleeve and being rotatable therewith, said first sealing element having a first sealing surface;
   a second component group comprising said bearing block cover and a second sealing element having a second sealing surface running on said first sealing surface and being supported by said bearing block cover;
   an axial bore penetrating said elastic sleeve and said bearing block cover and permitting the feeding of coolant into the roller through at least one of said journals;
   wherein the sealing surfaces of the sealing elements are perpendicular to a rotational axis of the roller; and wherein said second sealing element is formed as a sliding ring on said bearing block cover; and
   a connection fitting being fixed to said bearing block cover and configured to receive a fluid and to allow fluid flow towards the roller;
   a pressure plate coupled to said bearing block cover;
   wherein said sliding ring on said bearing block cover is supported by said pressure plate coupled to said bearing block cover.

2. A device according to claim 1, wherein said pressure plate is movably supported in a radial direction.

3. A device according to claim 2, wherein said elastic sleeve is removably coupled to said flange.

4. A device according to claim 2, wherein said elastic sleeve is a compensator.

5. A device according to claim 2, wherein said first sealing element is a sliding ring.

6. A device according to claim 5, wherein at least one of said sliding rings comprises electro carbon graphite or silicon carbide.

7. A device according to claim 1, wherein said elastic sleeve is removably coupled to said flange.

8. A device according to claim 7, wherein said elastic sleeve is a compensator.

9. A device according to claim 7, wherein said first sealing element is a sliding ring and said second sealing element is a sliding ring.

10. A device according to claim 9, wherein at least one of said sliding rings comprises electro carbon graphite or silicon carbide.

11. A device according to claim 1, wherein said elastic sleeve is a compensator.

12. A device according to claim 1, wherein said first sealing element is a sliding ring.

13. A device according to claim 12 wherein at least one of said sliding rings comprises electro carbon graphite or silicon carbide.

14. The device as in claim 1, further comprising a roller having a roller bore, wherein said flange is coupled to said roller and is positioned in said roller bore.

15. A device for connecting of a coolant feed to a roller of continuous casting plants, comprising:
   a roller having a bore;
   a bearing block comprising a journal and a roller bearing, wherein said bearing block is configured to mount to said roller by way of said journal in said bearing block in said roller bearing;
   a bearing block cover being fixed on said bearing block, which bearing block cover covers said roller bearing and said journal;
   a first component group comprising a flange unit having a flange coupled to said roller and being positioned in said roller bore, an elastic sleeve being coupled to said flange, and a first sealing element being coupled to said elastic sleeve and being rotatable therewith, said first sealing element having a first sealing surface;
   a second component group comprising said bearing block cover and a second sealing element having a second sealing surface running on said first sealing surface and being supported by said bearing block cover; an axial bore penetrating said elastic sleeve and said bearing block cover and permitting the feeding of coolant into the roller through the journal;
   wherein the sealing surfaces of the sealing elements are perpendicular to a rotational axis of the roller; and wherein said second sealing element is formed as a planar surface on said bearing block cover;
a pressure plate coupled to said bearing block cover;
wherein said second sealing element on said bearing block cover is supported by said pressure plate coupled to said bearing block cover.

16. The device as in claim 15, further comprising a connection fitting which is configured to deliver the coolant to said roller, said connection fitting being fixed to said bearing block cover.

* * * * *